United States Patent [19]

Sato et al.

[11] Patent Number: 4,963,375
[45] Date of Patent: Oct. 16, 1990

[54] METHOD OF CONTROLLING THE BAKING OF FOODS

[75] Inventors: Akira Sato; Toshio Sato; Kiyoshi Yamanoi, all of Kawasaki, Japan

[73] Assignee: Meiji Seika Kaisha Co., Ltd., Tokyo, Japan

[21] Appl. No.: 344,726

[22] Filed: Apr. 28, 1989

[30] Foreign Application Priority Data

May 2, 1988 [JP] Japan .................. 63-107674

[51] Int. Cl.$^5$ .................................................. A23L 1/01
[52] U.S. Cl. .................................. 426/233; 426/231; 426/523
[58] Field of Search .................. 426/233, 523; 99/324, 99/325, 326, 334

[56] References Cited

U.S. PATENT DOCUMENTS

| | | | |
|---|---|---|---|
| 4,230,731 | 10/1980 | Tyler | 426/233 |
| 4,397,875 | 8/1983 | Gilliom | 426/523 |
| 4,484,050 | 11/1984 | Horinouchi et al. | 99/325 |
| 4,734,553 | 3/1988 | Noda | 99/325 |
| 4,818,547 | 4/1989 | Miwa et al. | 426/233 |

*Primary Examiner*—Donald E. Czaja
*Assistant Examiner*—D. Workman
*Attorney, Agent, or Firm*—Armstrong, Nikaido, Marmelstein, Kubovcik & Murray

[57] ABSTRACT

Method of controlling the baking for foods, wherein an amount of heat absorbed by a portion near the food to be baked in an oven is measured to control heating temperature and/or air flow rate in the oven, based on the measured amount of heat.

1 Claim, 2 Drawing Sheets

METHOD OF CONTROLLING THE BAKING OF FOODS

BACKGROUND OF THE INVENTION

1. Field of the Invention

The present invention relates to a method of controlling the baking for foods, for instance a biscuit, cookie, sponge cake, bread, snack confectionery, beans and the like.

2. Related Art

Hithereto, the baking of foods has been controlled under basic factors of baking temperature and baking period of time. Namely, an expert sets a certain standard baking temperature and baking period of time through his careful experiments, wherein states of baking on the food are checked by taking browning, water content, taste and others into consideration. Then, a worker operates the baking apparatus based on said controlling factors of the standard baking temperature and baking period of time, which may be trimmed by manual control to provide final baked products having quality same with or near to that of a standard product.

Such standard baking temperature and baking period of time, as controlling factors for baking, become guidelines with a good reproducibility to provide baked products of substantially same quality, when the products are obtained with use of same type baking apparatus. However, it has often been experienced that a quality of baked products is quite different, even if the baking temperature and baking period of time are set to same values, when the products shall be obtained with use of baking apparatus in different type.

The inventors have carefully studied and investigated in various view points, as to cause of such phenomenone to find that even if an environmental or surrounding temperature and staying period of time of the food in the baking apparatus are set in same values, a heat transfer rate of conduction heat transmitted to the food to be heated and/or intensity of heat to be radiated thereto from a heat sorce or inner wall of the baking apparatus are different, due to a difference in structure of the type of selected baking apparatus and a delicate or slight change in its operating condition, to give remarkable influence on baking degree of the food.

This will be explained in more detail, as to case, wherein a heated air forcedly circulating type home gas oven "A" or a natural convection type home gas oven "B" is employed as the baking apparatus. In the first place, the environmental temperature in these ovens "A" and "B" was set at 180° C. A copper test piece painted with a thermal resistance black paint and a thermocouple is incorporated therein was put in each oven to measure temperature changes with an interval. Results are shown in FIG. 1. The test piece was painted in black to absorbe major part of the radiation heat, in addition to the conduction heat, so that it can be said that temperature rising speed of the test piece shows a total heating ability of the oven, as sum of the conduction heat and radiation heat to be generated by the oven. Judging the results shown in FIG. 1, by taking the fact into consideration, the temperature rising speed of the test piece in oven "A" is remarkably high, in comparison with that in oven "B" and thus the former oven is more excellent than the latter in its total heating ability.

The sum of conduction heat and radiation heat has generally been called as —an apparent heat transfer rate (h)—, and an amount of heat (kcal/hr) transmitted to a substance to be heated in a baking apparatus is, in general, estimated by $$ah(T-T') \quad (I)$$

wherein
h: Apparent heat transfer rate (kcal/m².hr.°C.),
a: Suface area of the substance to be heated (m²),
T: Environmental temperature (°C.), and
T': Temperature of the substance to be heated (°C.).

As apparent from the equation (1), an amount of heat transmitted to the substance to be heated depends on 2 factors of the environmental temperature and apparent heat transfer rate. If an apparent heat transfer rate in the ovens "A" and "B" is calculated based on each temperature rising curve on the test pieces arranged in the oven on the aforesaid experiments, following results can be obtained, which show a fact that the apparent heat transfer rate bacomes quite different, depending on difference of the type of selected ovens.

Oven "A": 41 (kacl/m².hr.°C.), and
Oven "B": 17

Turning now to the baking per se, a baking degree of foods depends on how much thermal energy has been absorbed by the food, rather than how long the food has been kept under what environmental temperature. In this case, the amount of heat transmitted to the food is determined by the both of the environmental temperature and heat transfer rate, as shown in said equation, which means that the baking temperature and baking period of time, as having been employed as basic controlling factors for baking have a poor correspondency with the amount of heat transmitted to the food to make the appropriate control of baking for foods difficult.

SUMMARY OF THE INVENTION

An object of the invention is to provide a method of controlling the baking for foods, which always attains an appropriate baking independently of a type of baking apparatus to be employed.

According to the invention, the object can be attained by a method of controlling the baking for foods, wherein an amount of heat as absorbed by a portion in a baking apparatus and in the vicinity of the food therein is measured to control at least one of factors of temperature for heating the food and air flow rate in the baking apparatus, based on the measured amount of heat.

In case of carrying out the method according to the invention, the amount of heat absorbed by the food may be determined by setting a thermocouple in a sample piece of the food per se or in a test piece having heat absorption characteristic close to that of the food, putting the thermocouple incorporating food or test piece in the baking apparatus, and measuring the temperature which rises in the food or test piece.

However, such a measuring system has disadvantages of that the measurement shall be limited in a short time period of until the temperature of sample (the food or test piece) reaches the environmental one in the baking apparatus, which means the system can be applied for a control of batch type baking apparatus, but can not be applied for a continuously operating type baking apparatus.

As another measuring system to be replaced to said system, namely the system capable of measuring an amount of heat transmitted to each food piece in the baking apparatus, when the food pieces are continuously fed through the baking apparatus, there is, for instance, one utilizing a combination of a heat sink and a heat flow sensor. According to this measuring system, the heat flow sensor is attached on tip end outer surface of a thermal resistant hollow cylinder, an inner space of which can be cooled, the cylinder is set in a baking apparatus and is kept at a fixed temperature by a coolant circulating the inner space thereof through the heat sink, so as to determine an amount of heat passing through the heat flow sensor. This measuring system will now be further explained in more detail. When an outer surface of the sensor is opposed to a heat source, thermal energy radiated from the heat source is absorbed by a heat receiving surface of the sensor and the heat thus received is transferred to the heat sink via the sensor. In this case, an electromotive force proportional to the passed thermal energy will appear across output terminals of the sensor. If all of the radiation thermal energy of the heat source is converted by the receiving surface of sensor into a thermal energy and transmitted to the heat sink, the sensor will indicate an exact value (kcal/m$^2$.hr) equal to the thermal energy radiated from the heat source and received by the sensor. However, a certain deviation from the exact amount will be caused in the indication of the sensor owing influences of absorption by the sensor per se, radiation of heat from the surrounding and from the sensor per se, convection between the sensor surface and the surrounding atmosphere etc. In an attempt to reduce such deviation, the sensor output is calibrated with reference to the thermal radiation energy density (kcal/m$^2$.hr) in the sensor surface, thereby permitting reduction of the measuring deviation simply by selecting a particular graduation in the scale of an associated meter. In measuring, such a sensor is connected to an HFM MC-L type indicator a graduation selecting dial is adjusted with reference to a particular constant which is allotted to the sensor, and the sensor is set with its surface towards an object, so that thermal radiation energy density of the object can be displayed in the indicator by the unit of kcal/m$^2$.hr.

Pieces of food in the baking apparatus will be subjected to the conduction heating from the surrounding air and the radiation heating from the heat source and the inner wall of the baking apparatus. The conduction-to-radiation heat ratio depends on type of oven to be selected. As for a baking apparatus using burning gas as its heat source to supply the flow of heated air, the conduction heating is predominant. As for a baking apparatus using an electric resistance type heater or an infrared heater as heat source to effect direct heating, the radiation heating is predominant. In any event, the pieces of food will be exposed to the both of conduction and radiation heating, when a conventional baking apparatus is employed.

All the conduction heat will be transmitted to the pieces of food, independent from kind of food, but absorption of the radiation heat will depend on the radiation rate of the food surface. For example, if a piece of certain food has a radiation rate of 0.5, only one half of the radiation heat will be absorbed by the food. The amount of the heat transmitted to the food and absorbed therein in the oven is given as the sum of the conduction heat and the radiation heat, but the amount of the radiation heat should, however, be corrected by taking the radiation rate of the particular food into consideration.

In controlling the baking of foods according to the present invention, an amount of heat absorbed by pieces of the food to be baked in a baking apparatus, therefore, is estimated as follows: a first object having a relatively high heat radiation rate "a" and a second object having a relatively low heat radiation rate "b" are put in the vicinity of the pieces of food in the baking apparatus; the amounts "$Q_1$" and "$Q_2$" of heat absorbed by the first object and second object are calculated from following equations (II) and (III):

$$Q_1 = C + aR \text{ (kcal/}m^2\text{.hr)} \qquad (II)$$

$$Q_2 = C + bR \text{ (kcal/}m^2\text{.hr)} \qquad (III);$$

and the amount "Q" of the heat absorbed by the pieces of food is estimated from the following equation:

$Q = C + \phi R$ (kcal/m$^2$.hr), wherein $\phi$ is the heat radiation rate of the food material. Then, at least one of factors of temperature for heating the food in the baking apparatus and an air flow rate in the food baking apparatus is controlled, based on the measured amount of the heat absorbed by the food.

According to the method of the invention, the controlling factor is specified as "at least one of temperature for heating the food in the baking apparatus and air flow rate in the baking apparatus". This is based on the inventor's finding: the flow rate is a significant controlling factor. In spite of this, the conventional melthod uses only "temperature and time" as controlling factors and is not appropriate for controlling the baking of foods. As the flow rate of air flowing over but near an outer surface of object to be baked increases, the amount of heat transmitted to the object will increase. This implies that the air flow rate is a useful controlling factor for baking. In conventional baking apparatus equipped with air circulator and ventilator, the air flow control is performed with a manual adjustment, and no automatic control is provided. The automatic control, however, cannot be effected without providing appropriate means to determine how the heat of conduction varies with air flow rate. For this purpose, thermometers are useless.

If the amount of heat absorbed by the object is measured, on the contrary to the above, change in air flow rate can be determined as change in the amount of heat absorbed by the object. Thus, the air flow rate in the baking apparatus can be automatically controlled in response to the heat absorbed by the object.

The air flow rate can be controlled by varying continuously the opening of the control valve of the duct through which the air is circulated, or by varying continuously the rotation speed of the blower to circulate the air.

FIG. 2 shows a relation between heat transfer rate and air flow rate by setting environmental temperature in different levels. As seen from the graph shown in the Figure, if the amount of heat taken by the object is controlled by changing the air flow rate, the apparent heat transfer rate changes rapidly and in a wide range, independent of environmental temperature, and the range, within which the apparent heat transfer rate changes is broad. For example, the increase of air flow rate from 0.5 m/sec to 1 m/sec will cause the change in the apparent heat transfer rate by about twice. Accordingly, the control by the air makes possible a desired control for baking, even if a sudden change in thermal load shall occur, for instance, at the initiation stage of baking.

DETAILED DESCRIPTION OF PREFERRED EMBODIMENT

Figure 1:
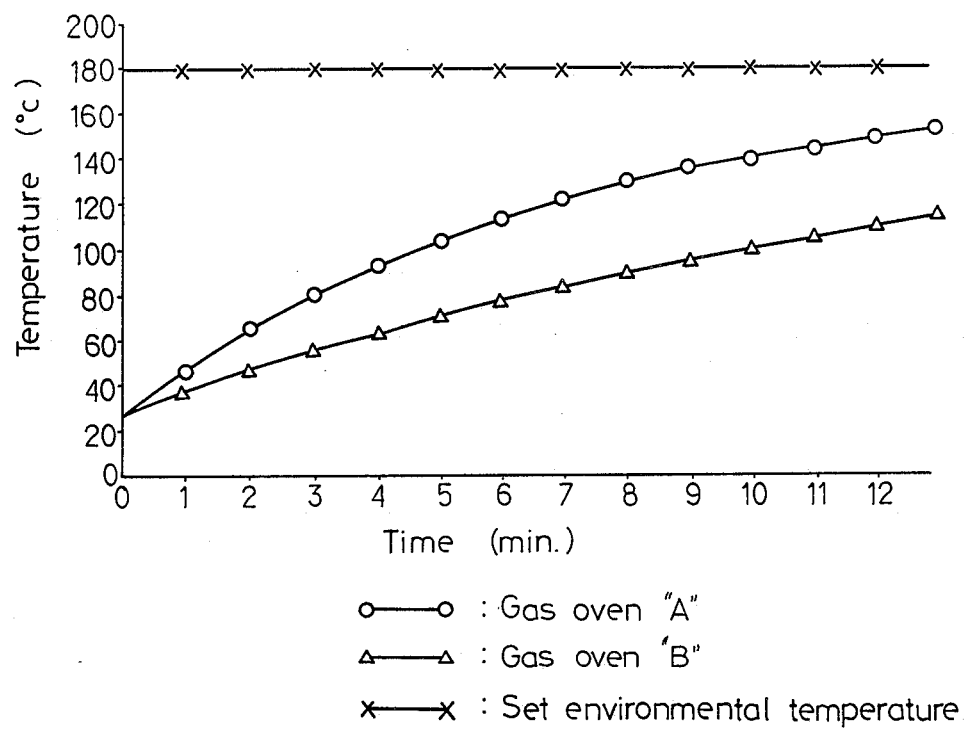
FIG. 1 is a graph showing changes in temperature of test pieces, each being arranged in an oven which is different in type and structure but an inner environmental temperature was set at same and fixed level.
Figure 2:
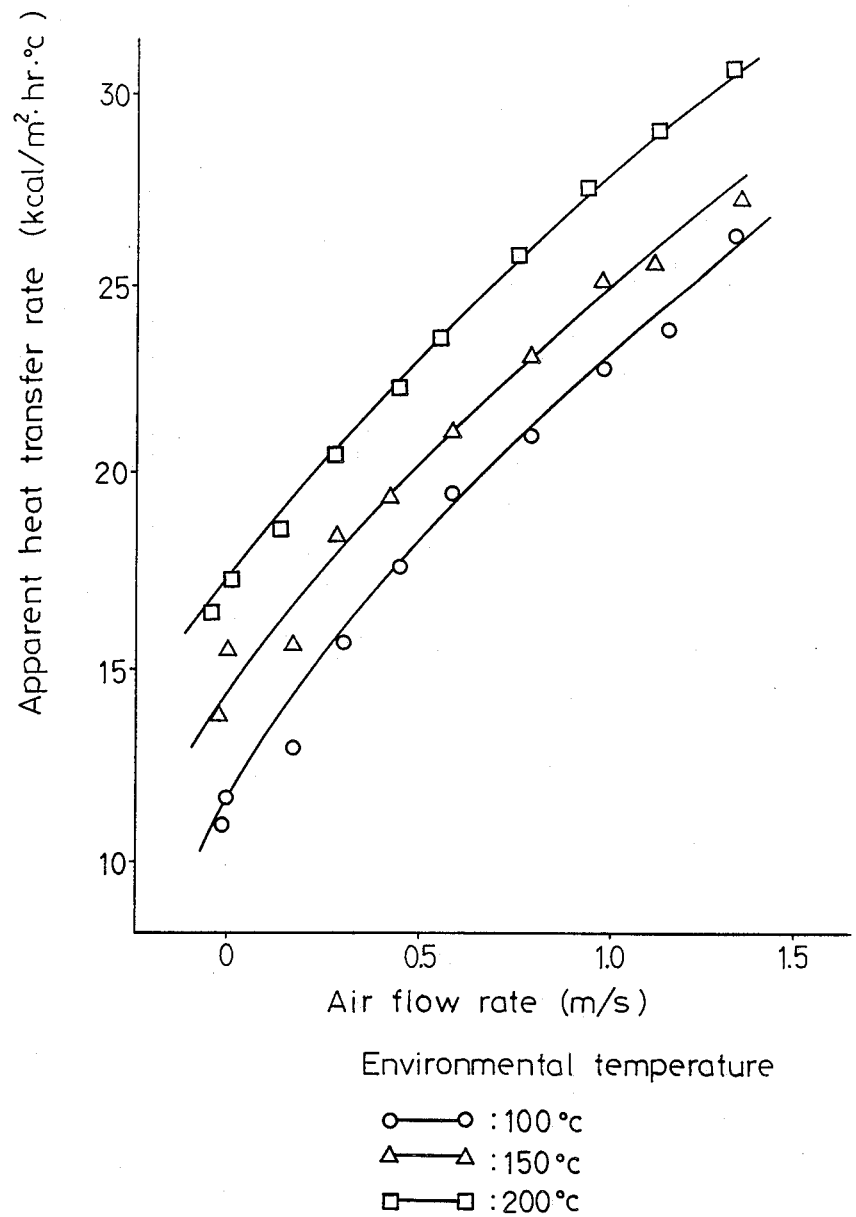
FIG. 2 is a graph showing a relation between an apparent heat transfer rate and air flow rate in an oven, inner temperature thereof being set in various levels.

The invention will now be further explained with reference to Example and Reference Examples.

EXAMPLE

A biscuit oven was used. It had a 30 meter long steel conveyer belt to supply pieces of biscuit raw material continuously and was composed of a first zone extending one third of the whole oven length from its entrance; a second zone extending another one third distance; and a third zone extending the remaining one third distance to its exit.

Each zone has gas burners each positioned on the upper and lower sides of the conveyer belt. A temperature control device was provided with for each zone to control each nozzle opening of the burners for performing indpendent temperature control in each zone.

Each zone had also an air circulating blower and duct positioned above the upper side and under the lower side of the conveyer belt, thereby permitting independent control of the air flow rate by changing the rotation speed of the blower. The air flow rate could be changed within the range from 0 to 2 m/sec.

A heat flow meter was prepared by attaching to a stainless steel hollow cylinder (90 cm length, 30 mm diameter) a heat sink to circulating water in the cylinder to cool a top end thereof, and fixing by soldering on the heat sink an E500 type heat flow sensor (manufactured by Kyoto Densi Kogyo Kabushiki Kaisha of Japan).

The heat flow meter was arranged above the upper surface of the belt conveyer at the center of each zone in the vicinity of the biscuit material to be baked. The surface of each heat flow meter was painted with a heat-resistant black paint.

Two heat flow meters were arranged below the lower surface of the conveyer belt in the opposing relation with the one above the upper surface of the conveyer belt. These two flow meters were parallel to each other, and their one end appeared outside of the oven wall. One of the flow meters was painted with heat-resistant black paint, whereas the other meter was painted with heat-resistant silver white paint.

The radiation rate of the black-printed heat flow meter was 0.9, whereas the radiation rate of the white-printed one was 0.1. The radiation rate of the biscuit material was 0.87 to 0.93. The radiation rate of the steel conveyer belt was 0.4.

Water at 30° C. was supplied to each heat sink at the flow rate of 400 ml/min. The output terminals of each heat flow meter were connected to a data processor (Type HFM MC-L, manufactured by Kyoto Denshi Kogyo Kabushiki Kaisha) to determine and display an amount of the heat absorbed by the heat flow meter in real time.

A browning measuring device such as VS-10 manufactured and sold by GORING KARR Limited (Britain) was used. It was provided at the outlet of the baking apparatus. The browning meter projected a beam of light to a baked biscuit to continuously determine its browning in terms of an amount of light reflected from the biscuit. The baking apparatus was equipped with a feed-back system using a signal from the browning meter for controlling the baking apparatus.

The controlling of the baking apparatus was effected as follows:

(a) In the first zone, it was preferable that heat be gradually applied to the raw food material and that the air be supplied at a relatively low flow rate, so as to inhibit surface drying of the raw food material. An experimental result showed that appropriate heating was 2000 kcal/m$^2$.hr. To effect such appropriate heating, the temperature above conveyer in the first zone was set at 170° to 180° C., and the rotation speed of the blower was adjusted to supply the flow of air, so that the heat flow meter's reading was 2000 kcal/.m$^2$.hr. The flow rate of air was determined to be about 0.5 m/sec. The food material was heated by both of the conduction heat and the radiation heat. The conduction heat shall be transmitted to the food material and the heat flow meter at the same rate, but the radiation heat is transmitted thereto, in proportion to the radiation rate inherent thereto. The food material and the black-painted heat flow meter had substantially same radiation rate, and therefore, an amount "q" of the heat absorbed by the black-painted heat flow meter was substantially equal to "q" of the heat absorbed by the food material.

In the first zone, the temperature under the conveyer was set at 170° to 180° C. which is same with one above the conveyer. The amount of the heat absorbed by the black-painted heat flow meter was 2000 kcal/m$^2$.hr, whereas an amount of the heat absorbed by the silver-white-painted heat flow meter was 1600 kcal/m$^2$.hr. Further, the radiation rate of the black-painted and silver-white-painted heat flow meter were 0.9 to and 0.1 respectively, as stated before.

By inserting such numeral values in equation II or III as referred to a preamble part of this specification, following equations can be prepared.

$$c + 0.9\ R = 2000\ (kcal/m^2.hr)$$
$$c + 0.1\ R = 1600\ (kcal/m^2.hr)$$

From the equations, the conduction heat (C) and radiation heat (R) can be determined as 1550 and 500 kcal/cm$^2$.hr, respectively.

It is preferable to equally heat a piece of food material on its both surfaces. In this instant case, an amount of heat absorbed by the food material from its lower surface, i.e. the heat transmitted through the steel conveyer become the amount of conduction heat (1550 kcal/m$^2$.hr) plus 40% (the radiation rate of the steel conveyer: 0.4) of the radiation heat (500 kcal/m$^2$.hr), so that it was totalized as 1750 kcal/m$^2$.hr which value is less than the amount absorbed by the food material from it upper surface, by 250 kcal/m$^2$.hr. Under assumption of that the radiation heat will not be influenced by the flow of air, the rotation speed of the blower was increased to increase the flow rate of air under the conveyer, so that the indicator for both of the black-painted and silver-white-painted heat flow meters displays value increased by 250 kcal/m$^2$.hr, whereby the meters will indicate the value of 2250 and 1850 kcal/m$^2$.hr, respectively. Therefore, the heatings of the food material from its upper and lower surfaces were well balanced to attain good baking condition in the first zone. At that time, it was found that air flow rate in the first zone and under the steel conveyer is of about 0.6 m/sec.

(b) In the second zone, it is preferable that heat be quickly applied to the food material to quickly evaporate a moisture therein, thereby making texture of the resulting biscuit soft. Accordingly, the oven has to work in its maximum range. Experimental results showed that an amount of heat of 4000 kcal/m$^2$.hr or more is required. In the second zone, particularly above its upper surface, the environmental temperature was set at 210° to 220° C. Then, the rotation speed of the blower was increased to make the air flow rate of about 1.6 m/sec for permitting the heat flow meters to indicate the amount of heat of 4000 kcal/m$^2$.hr.

In this second zone, particularly below its lower surface, the environmental temperature was set at 210° to 220° C. Then, the flow rate of air was controlled in the same way as in the first zone to effect the substantially same heating with the upper surface, as above. An air rate required therefor was of about 1.8 m/sec.

(c) In the third zone, it is necessary that heating be controlled to cause preferable browning on the surface of the food material. Therefore, the temperature and the flow rate of air were controlled based on a degree of browning of the food material surface rather than an amount of the heat absorbed by the heat flow meters. The browning measuring device described before was used to determine the browning of the food material, and the signal representing any deviation from the desired browning was feedback to the blower in the third zone, thereby reducing the rotation speed of the blower in case of over browning, and increasing the rotation speed of the blower in case of insufficient browning. A linear control was employed, wherein a width of blower control range becomes maximum, when ±20% deviation will occur in browning of the food material with respect to a standard or desired browning. A heating temperature and flow rate of air were balance-controlled to cause the desired browning on the food material surface by operating the blower, based on its medium rotation speed just between the mixture and minimum speeds.

More specifically, when the deisred browning was attained at a blow rotation speed in the level higher than the medium speed, the rotation speed of blower was decreased, while rising an environmental temperature, whereas when the desired browning was attained at a blow rotation speed in the level lower than the medium speed, the rotation speed of blower was increased toward the medium speed, while lowering the environmental temperature. These operations in different mode were automatically balanced with an aid of linear control, wherein a width of the blower rotation control becomes maximum, when ±20% deviation will occur on the environmental temperature. In this case, the range for controlling the environmental temperature was 205° to 210° C.

The control of thermal supplying amount, which utilizes the change in air flow rate can rapidly change a heating state for permitting to attain even and desired browning. On the contrary thereto, a control depending exclusively on heating temperature is not suitable for adjusting the browning, since a response to temperature control for a heat source is slow in ovens with a high thermal capacity.

Further, the pre-setting of the blower rotation speed at its medium level, as stated before, will permit to expand a range for allowing a derivation which may be occurred in the preceding step.

Reference Example 1

Browning control experiments were carried out to compare the baking control according to the invention with a conventional baking control, with use of baking apparatus as in Example. The browning control, as far as the conventional method is concerned, was effected based on temperature control in the third zone and without use the air flow control, as controlling factor. Specifically, the air flow rate was set at the fixed value of 1 m/sec. The temperature control in the third zone was carried out in response to the signal from the browning measuring device at the outlet of the oven to control the heating temperature of the third zone. Then, the proportional control was adopted, causing 10% temperature change for ±20% browning derivation with respect to the standard browning.

During 5 hour continuous running operation after the stable baking condition was reached, 10 pieces of biscuit were selected randomly in every 5 minutes. Then, these sample pieces were checked on browning from reflectivity of light (lightness) with the aid of a colorimeter (color difference meter). The results were given in a relative value based on that a lightness of color in a standard sample is as 100%.

The browning control according to the invention was carried out in the same way as in Example, and results are shown in following Table 1.

TABLE 1

| | Variability (max. to min.) | Standard Deviation |
|---|---|---|
| Conventional method | ±9.8% | 4.2% |
| Invention method | ±5.2% | 2.3% |

Reference Example 2

The oven used in Example has so large in its thermal capacity that it had to be pre-heated before starting the baking operation. In the conventional method in which the oven was controlled based on temperature while keeping the air flow at a fixed rate, the environmental temperature in the oven has reached a set valve, after lapsed 30 minutes. At that time, a baked food, however, was found to be unsatisfactory because of too light browning and insufficient swelling. Satisfactory products resulted after 1 hour from the initiation of the pre-heating.

In another experiment embodying the method of the invention, the oven was set to a targeting heat amount condition by controlling air flow rate in the oven, at the time of that temperature in the oven has reached a level near the setting value, to initiate the operation for baking the food material, so that desired good products can be obtained, even if the temperature in both of the first and second zones were lower by 5° C. than those of the setting values.

As a result, the required pre-heating period of time was shortened to 25 minutes, from 1 hr as in the conventional method.

Following Table 3 shows summaries on baking conditions and results for this Reference Example 2.

TABLE 2

| Conventional method | Method of the invention |
|---|---|
| 1st zone | |
| Set temperature: 175 C., | Set temperature: 175 C., |
| Set flow rate: 0.5 m/sec | Set heat amount: |
| | 2000 kcal/m².hr |
| 2nd zone | |
| Set temperature: 215 C. | Set temperature: 215 C., |
| | Set heat amount: |
| | 4000 kcal/mp².hr |
| 3rd zone | |
| Heat source temperature control, | Automatic control based on browning, with an aid |
| Automatic control based on browning, | of control in air flow rate |
| Set flow rate: 1.0 m/sec | |
| Pre-heating 30 minutes: inadequate browning | Pre-heating: 25 minutes (good products) |
| inadequate swelling, 50 minutes: | |
| inadequate swelling, 60 minutes: | |
| good products | |

As summaries of the above, it can be said as follows.

(1) The conventional baking method of foods has been carried out by adopting the heating temperature and heating period of time, as controlling factors, but a high skill was required for the baking control, since the factors do not reflect an actual baking.

(2) On the contrary thereto, the method according to the invention is carried out, as a controlling factor, an amount of heat absorbed by the food material per se, so that desired baked products can be obtained independency of the type of baking apparatuses to be employed.

(3) In a method according to the invention, the amount of heat absorbed by the food material to be baked can be controlled with an aid of rate of air flow in the baking apparatus, so that a rapid control is possible and that a control range becomes wider.

What is claimed is:

1. A method of controlling the baking of foods comprising the steps of measuring an amount of heat to be absorbed by a piece of food material by putting a first object having a relatively high heat-radiation rate (a) and a second object having a relatively low heat-radiation rate (b), in the vicinity of the piece of food material in the food baking apparatus;

measuring amounts ($Q_1$) and ($Q_2$) of heat absorbed by the first object and second to calculate conduction heat (C) and radiation heat (R) from equations of $Q_1 = C + aR$ (kcal/$m^2$.hr) and $Q_2 = C + bR$ (kcal/$m^2$.hr);

estimating an amount of (Q) of heat absorbed by the piece of food from the equation of $Q = C + \phi R$ (kcal/$m^2$.hr)

wherein C and R are above calculated values and $\phi$ is heat radiation rate of the food material; and controlling at least one of environmental temperature and air flow rate in the baking apparatus, based on the estimated amount of heat (Q).

* * * * *